US009840392B2

(12) United States Patent
Fenske (10) Patent No.: US 9,840,392 B2
(45) Date of Patent: Dec. 12, 2017

(54) QUICK CHANGE HEIGHT ADJUSTMENT MECHANISM FOR A REEL STAND (71) Applicant: Greenlee Textron Inc., Rockford, IL (US)

(72) Inventor: John Fenske, Machesney Park, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 15/177,592

(22) Filed: Jun. 9, 2016

(65) Prior Publication Data

US 2016/0362273 A1 Dec. 15, 2016

Related U.S. Application Data (60) Provisional application No. 62/175,530, filed on Jun. 15, 2015.

(51) Int. Cl.
B65H 49/32 (2006.01)
F16M 11/24 (2006.01)

(52) U.S. Cl.
CPC .......... B65H 49/32 (2013.01); B65H 49/325 (2013.01); F16M 11/24 (2013.01); F16M 2200/028 (2013.01)

(58) Field of Classification Search
CPC ...... B65H 49/32; B65H 49/325; F16M 11/24; F16M 2200/028; B66F 7/22; B66F 7/28; B66F 9/02
USPC ......................................................... 242/591
See application file for complete search history.

(56) References Cited

U.S. PATENT DOCUMENTS 3,325,120 A   6/1967   Brinkman
3,595,527 A   7/1971   Douglass
7,000,900 B1  2/2006   McKenney et al.

OTHER PUBLICATIONS

Jackstand Assy, Reel (683) 783310153726, Greenlee Textron Inc., http://www.greenlee.com/products/JACKSTAND-ASSY%2540c-REEL--(683).html, 2015, 1 page.
Stand Assy, Telescoping (687) 783310170761, Greenlee Textron Inc., http://www.greenlee.com/products/STAND-ASSY%2540c-TELESCOPING-(687).html, 2015, 1 page.
CRA1029R—Reel Jack, Simplex Product Details, http://www.tksimplex.com/html/print_product_detail.php?pid=103&catname=Mechanical& . . . , 2015, 1 page.
Maxis Jax(TM) Reel Stands, Model #MJ707, Southwire Company, southwire.com, 2013, 2 pages.

(Continued)

Primary Examiner — William E Dondero
(74) Attorney, Agent, or Firm — Klintworth & Rozenblat IP LLP (57) ABSTRACT

A quick change height adjustment mechanism allows a reel stand to accommodate differently sized storage spools. The mechanism includes a plate, a locking pin and a pivot pin. The plate forms a cavity into which a post is seated and has at least one space which receive a spindle of the spool. The locking pin extends from the plate and into the cavity. The locking pin is vertically spaced from, and positioned on a first side of, a centerline of the plate. The pivot pin is attached to the plate, is vertically spaced from, and positioned on a second, opposite side of, the centerline. The pivot and locking pins are positioned on opposite sides of the post. In use, the plate can be pivoted relative to the post around pivot pin to engage or disengage the locking pin with holes in the post.

23 Claims, 8 Drawing Sheets (56) References Cited

OTHER PUBLICATIONS

Real Jacks(TM), iToolco, LLC, http://itoolco.com/products/real-jacks/, 2013, 2 pages.
"Cable Handling Equipment Catalogue," G.V. Kinsman Pty. Ltd. Industrial Electrical Product Company, West Sunshine, Vic, www.gvk.com.au, 2008, pp. 20-23 (33 pages total in the attached).

QUICK CHANGE HEIGHT ADJUSTMENT MECHANISM FOR A REEL STAND

This application claims the domestic benefit of U.S. Provisional Application Ser. No. 62/175,530, filed on Jun. 15, 2015, the contents of which are incorporated herein in its entirety.

FIELD OF THE DISCLOSURE

The present disclosure relates to cable pulling and specifically to a quick change height adjustment mechanism for a reel stand.

BACKGROUND

It has been the conventional practice to mount wire or cable storage reels onto a fixed reel stand so that the cable or wire stored on the wire or cable storage reel can be withdrawn or unwound in an orderly manner. It is desirable for the height of the reel stand to be adjustable to accommodate differently sized wire or cable storage reels.

SUMMARY

A quick change height adjustment mechanism allows a reel stand to accommodate differently sized storage spools. The mechanism includes a plate, a locking pin and a pivot pin. The plate forms a cavity into which a post is seated and has at least one opening which receive a spindle of the spool. The locking pin extends from the plate and into the cavity, The locking pin is vertically spaced from, and positioned on a first side of, a centerline of the plate. The pivot pin is attached to the plate, is vertically spaced from, and positioned on a second, opposite side of the centerline. The pivot and locking pins are positioned on opposite sides of the post. in use, the plate can be pivoted relative to the post around pivot pin to engage or disengage the locking pin with holes in the post.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A pair of reel stands 20, 120 (only one of which is shown) are used to support a conventional storage reel or spool 22. The storage reel or spool 22 has a plurality of turns of cable or wire (not shown) wound about its central drum. The storage reel or spool 22 has enlarged flanges 26 on either side of the drum and the cable or wire is mounted between the flanges 26. A spindle 24 passes through the arbor holes of each flange 26 and the central drum. The ends of the spindle 24 are supported by the pairs of reel stands 20 as described herein.

Each reel stand 20, 120 is formed of a base 28 having a head 30, 130 mounted thereon. The base 28 rests on the floor or ground. The bases 28 of the pairs of reel stands 20, 120 may be connected together to form a single component. The head 30, 130 has a quick change height adjustment mechanism which allows a user to quickly and easily adjust the position of the head 30, 130 along the height of the base 28 to adjust the position of the head 30 relative to the floor or ground.

The base 28 is formed of a support 32 having an upright, vertical post 34 extending upwardly therefrom. As shown, the support 32 is formed from a central hub 40 from which a pair of horizontal braces 42a, 42b extend outwardly. Each brace 42a, 42b terminates in foot 44a, 44b which engages with the floor or ground. The support 32 may take a variety of forms and is not limited to that shown in the drawings. As shown, the post 34 is formed of a pair of telescoping tubes 35a, 35b which can be fixed together at varying heights. The post 34 may take a variety of cross-sections, such as square, rectangular, circular, etc. The tubes 35b, 35b are each formed of a side wall 38. As shown, the tubes 35a, 35b are square having four side sections, however, other side wall shapes may be provided. For example, if the tubes 35a, 35b are formed with a circular cross-section, only a single continuous side wall would be formed.

Figure 1:
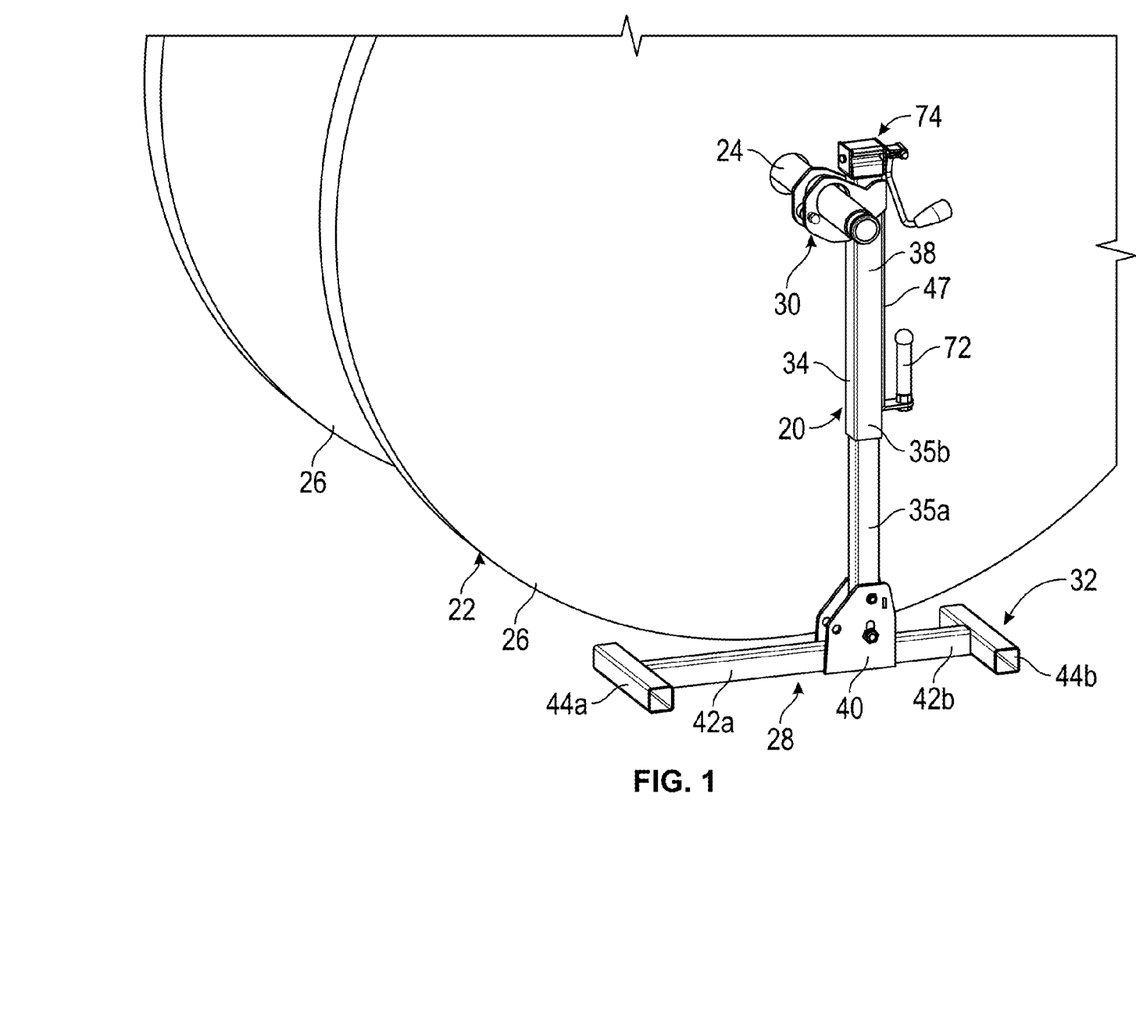
FIG. 1 is a perspective view of a reel stand according to an embodiment of the disclosure shown engaged with storage reel or spool.
Figure 2:
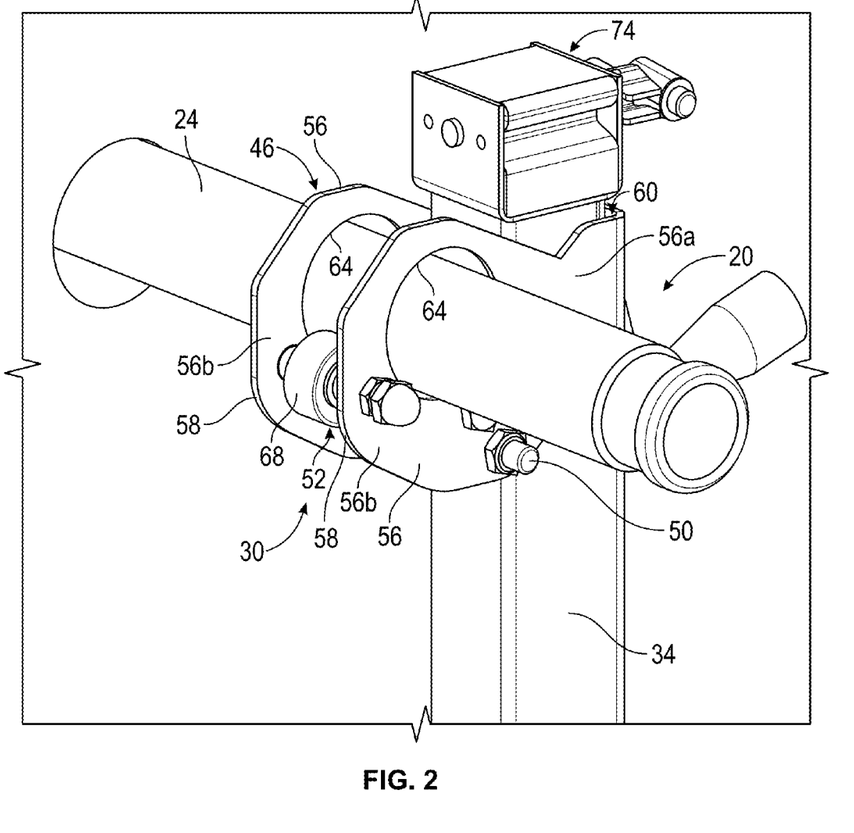
FIG. 2 is an enlarged perspective view of the reel stand shown engaged with storage reel or spool.
Figure 3:
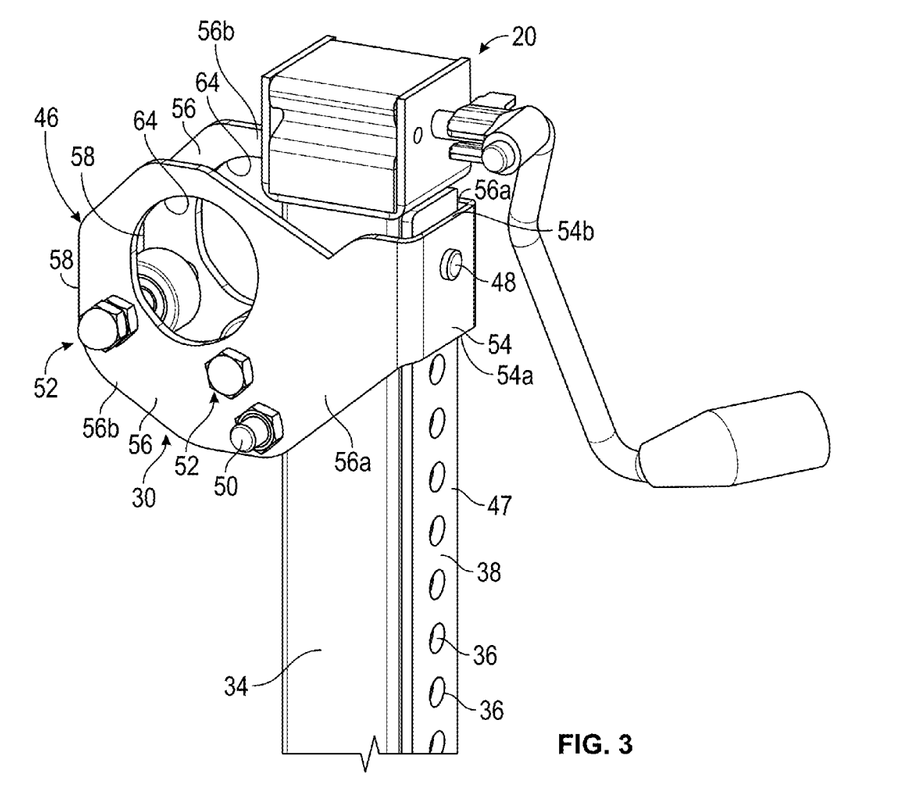
FIG. 3 is an alternate perspective view of the reel stand.

As shown in FIG. 3, tube 35b of the post 34 has a plurality of vertically aligned, spaced apart holes 36 in the side wall 38. The plurality of holes 36 is formed of at least two holes 36 and is only restricted by the length of the post 34. The holes 36 are provided in a vertical row and extend along at least a portion of the height of the post 34. The holes 36 can be provided as through-holes through the post 34, may be formed as recesses in the post 34, or may be formed in a separate plate 47 (which then forms part of the side wall 38) as through holes or recesses and the plate 47 is attached to the post 34.

Attention is invited to the first embodiment of the head 30 most clearly shown in FIGS. 2-6. The head 30 of this embodiment is formed of a generally U-shaped plate 46 having a locking pin 48 thereon, a pivot pin 50 and at least a pair of roller assemblies 52. The plate 46, the locking pin 48 and the pivot pin 50 form the quick change height adjustment mechanism for the reel stand 20. The spindle 24 of the storage reel or spool 22 engages with the roller assemblies 52.

Figure 4:
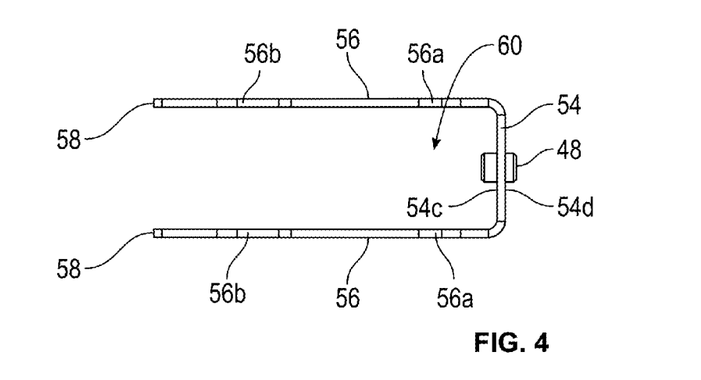
FIG. 4 is a top plan view of a plate of the reel stand.
Figure 5:
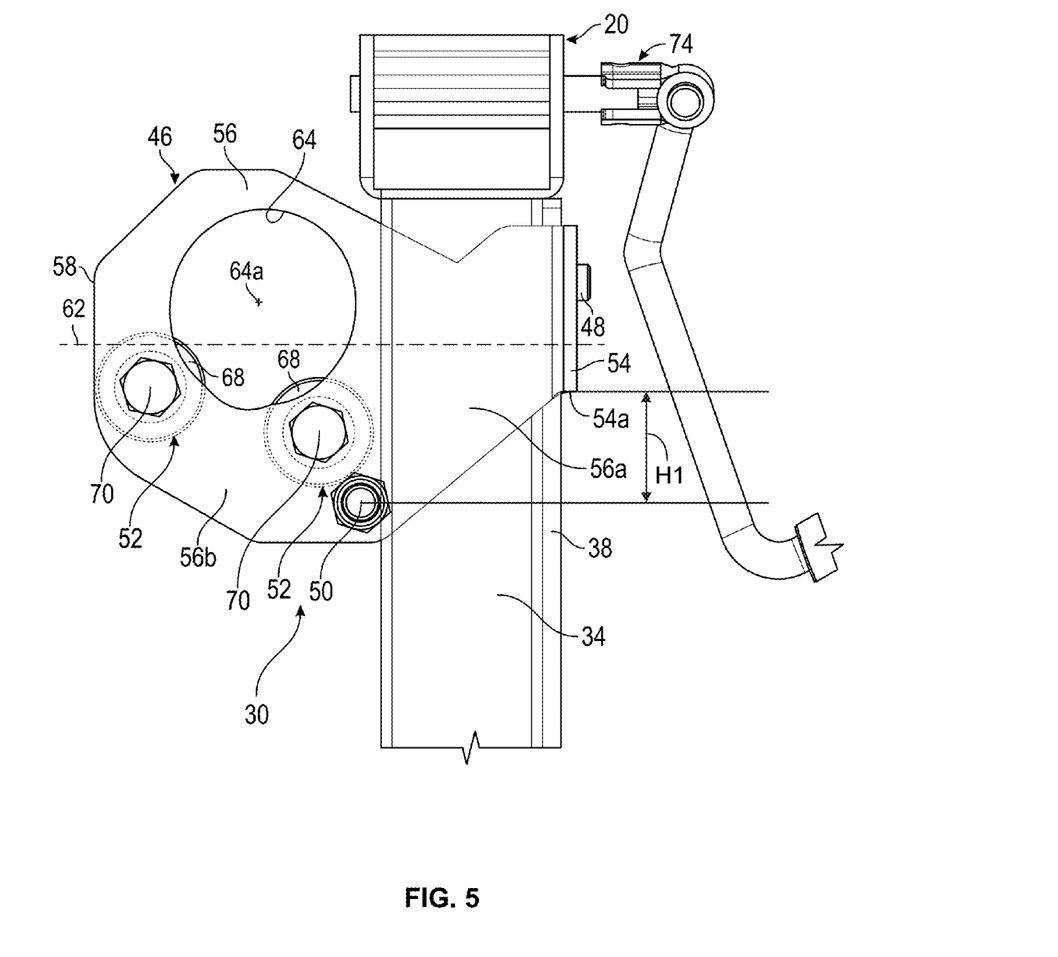
FIG. 5 is a side elevation view of the reel stand in a first position.

The plate 46 is formed from a base wall 54 and a pair of side walls 56 extending outwardly therefrom such that a cavity 60 is formed within the plate 46. If desired, an end wall (not shown) can be provided between the ends of the side walls 56 opposite to that of the base wall 54 to form a tube-like structure. As best shown in FIGS. 3 and 4, the base wall 54 has a lower edge 54a, an upper edge 54b, an inner surface 54c, an outer surface 54d and opposite side edges. The side walls 56 extend from the side edges of the base wall 54 such that the side walls 56 are spaced apart from each other. Each side wall 56 terminates in an end 58. A horizontal centerline 62 of the plate 46, see FIG. 5, is defined between the base wall 54 and the ends 58 of the side walls 56.

The post 34 seats within the cavity 60 such that the inner surface 54c of the base wall 54 is proximate to, and may abut against, the side wall 38 of the post 34, a first section 56a of each side wall 56 is proximate to, but spaced from the side wall 38 of the post 34 and a second section 56b of each side wall 56 extends outwardly from the side wall of the post 34. The first and second sections 56a, 56b of each side wall 56 are aligned. The first sections 56a of the side walls 56 may be shaped to conform to the cross-section of the post 34.

Figure 6:
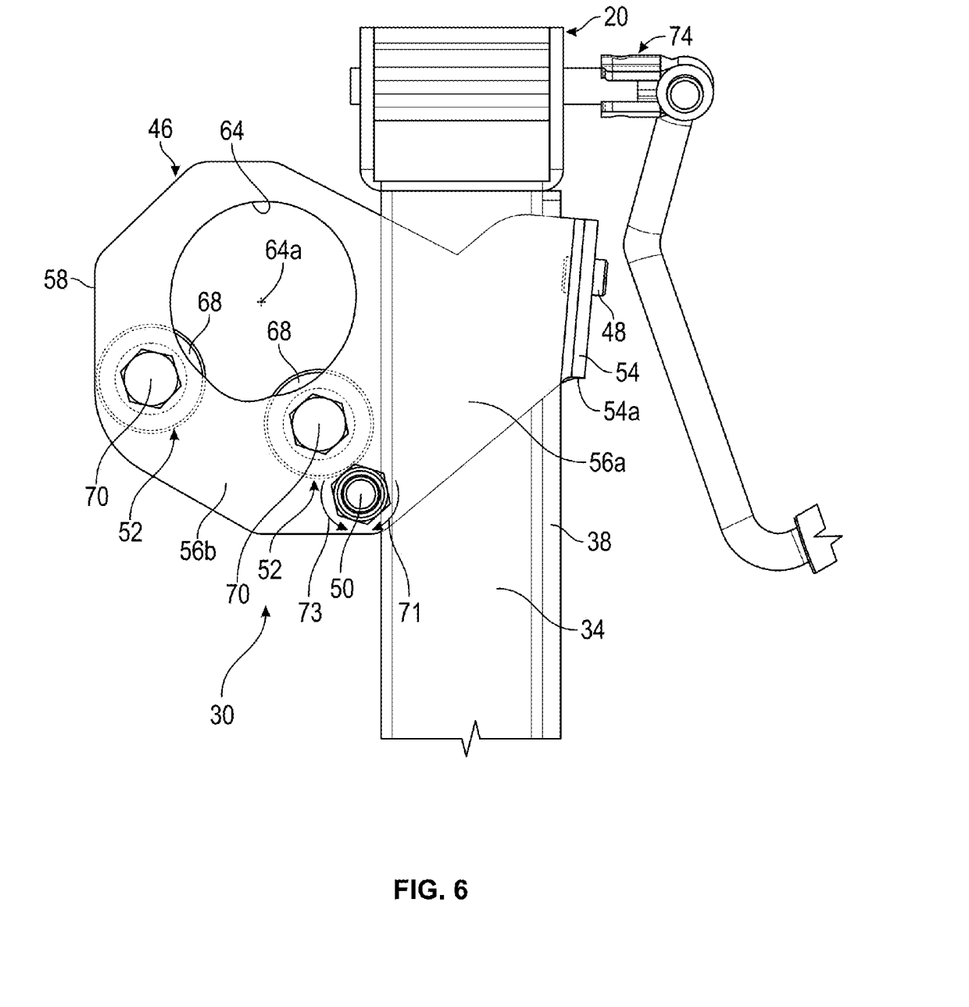
FIG. 6 is a side elevation view of the reel stand in a second position.
Figure 7:
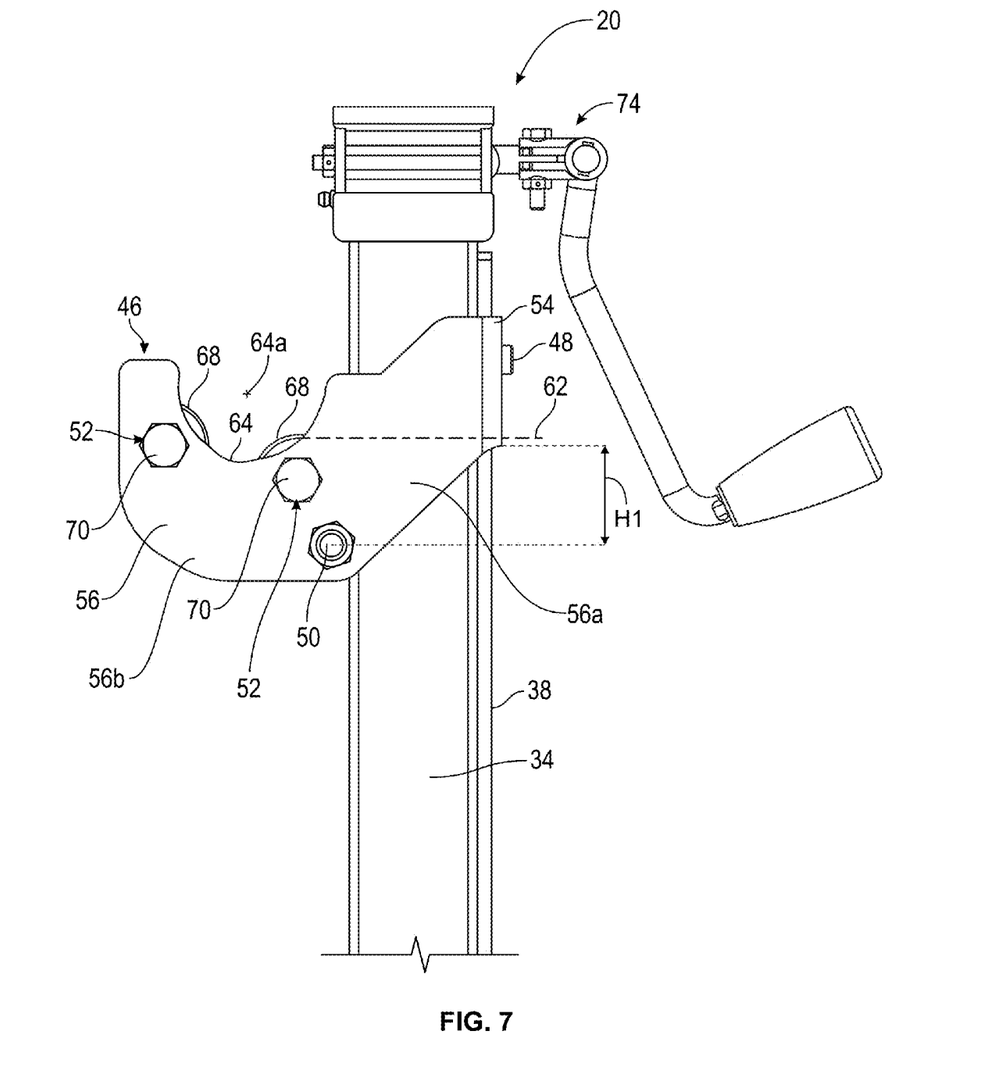
FIG. 7 is a side elevation view of a modified reel stand according to another embodiment of the disclosure.

The second section 56b of each side wall 56 has a space 64 therein through which the spindle 24 extends in use. The space 64 in each side wall 56 may be surrounded by the second section 56b of each side wall 56 as shown in FIGS. 1-6 to form a through hole, or may be partially surrounded by the second section 56b of each side wall 56 (for example, the top side of each space 64 is open as shown in FIG. 7). Each space 64 has a centerline 64a, and the spaces 64 are aligned with each other.

The locking pin 48 extends outwardly from the inner surface 54c of the base wall 54 and into the cavity 60, see FIG. 4. The locking pin 48 is suitably attached to the base wall 54, such as by being integrally formed, formed as a separate member and welded thereto, or being threadedly engaged with the base wall 54. The locking pin 48 has a diameter which is slightly smaller than the diameters of the holes 36, such that the locking pin 48 can be inserted into and removed from the holes 36 as described herein.

The pivot pin 50 extends between the second sections 56b of each side wall 56. The plate 46 can pivot around the pivot pin 50. The pivot pin 50 is positioned proximate to the side wall 38 of the post 34 and the pivot pin 50 is always engaged with the side wall 38 of the post when the locking pin 48 is engaged in a hole 36. The pivot pin 50 is positioned on the opposite side of the post 34 to that where the locking pin 48 is provided. As shown in FIG. 5, the pivot pin 50 of some embodiments is positioned below the centerline 62 of the plate 46, and the locking pin 48 is positioned above the centerline 62 of the plate 46. The position of the axis of the pivot pin 50 relative to the lower edge 54a of the base wall 54 defines a height H1. The space 64 in each side wall 56 may be positioned anywhere in the second section 56b, provided that the centerline 64a of the spaces 64 are outboard of the pivot pin 50. The spaces 64 may pass through the centerline 62.

Each roller assembly 52 is formed of a roller 68 having an axle 70 extending therethrough. The ends of the axle 70 extend through, and are attached to, the second sections 56b of the side walls 56. Each roller 68 can freely rotate around its respective axle 70. The axles 70 are positioned below the centerlines 64a of the spaces 64 and the rollers 68 partially overlap the spaces 64 such that when the spindle 24 of the storage reel or spool 22 is inserted through the spaces 64, the spindle 24 of the storage reel or spool 22 engages with the rollers 68. This allows the spindle 24 and the storage reel or spool 22 riding on top of it to easily rotate relative to the reel stand 20. The roller assemblies 52 are spaced from the pivot pin 50. The roller assemblies 52 are not required.

In use, the position of the head 30 is adjusted to raise or lower the head 30 to the height of the spindle 24 within the storage reel or spool 22. In an initial position as shown in FIG. 5, the locking pin 48 is engaged within one of the holes 36 in the post 34. To adjust the position of the head 30 relative to the post 34, the plate 46 is pivoted around pivot pin 50 in a first direction 71 relative to the centerline 62 to remove the locking pin 48 from the hole 36 as shown in FIG. 6. The height H1 between the centerline of the pivot pin 50 and the lower edge 54a of the base wall 54 provides the ability to disengage locking pin 48. During this disengagement of locking pin 48, the lower edge 54a of the base wall 54 may engage with the side wall 38 of the post 34. The head 30 is then slid along the height of the post 34 until the head 30 is positioned in the desired position. The plate 46 is then pivoted around pivot pin 50 in a second, opposite direction 73 relative to the centerline 62 to reengage the locking pin 48 within the new hole 36 that is proximate to the locking pin 48 to the position shown in FIG. 5. The weight of the spindle 24 and the storage reel or spool 22 puts a moment on the plate 46 about the pivot pin 50, keeping the locking pin 48 retained in the hole 36 in the post 34.

Figure 8:
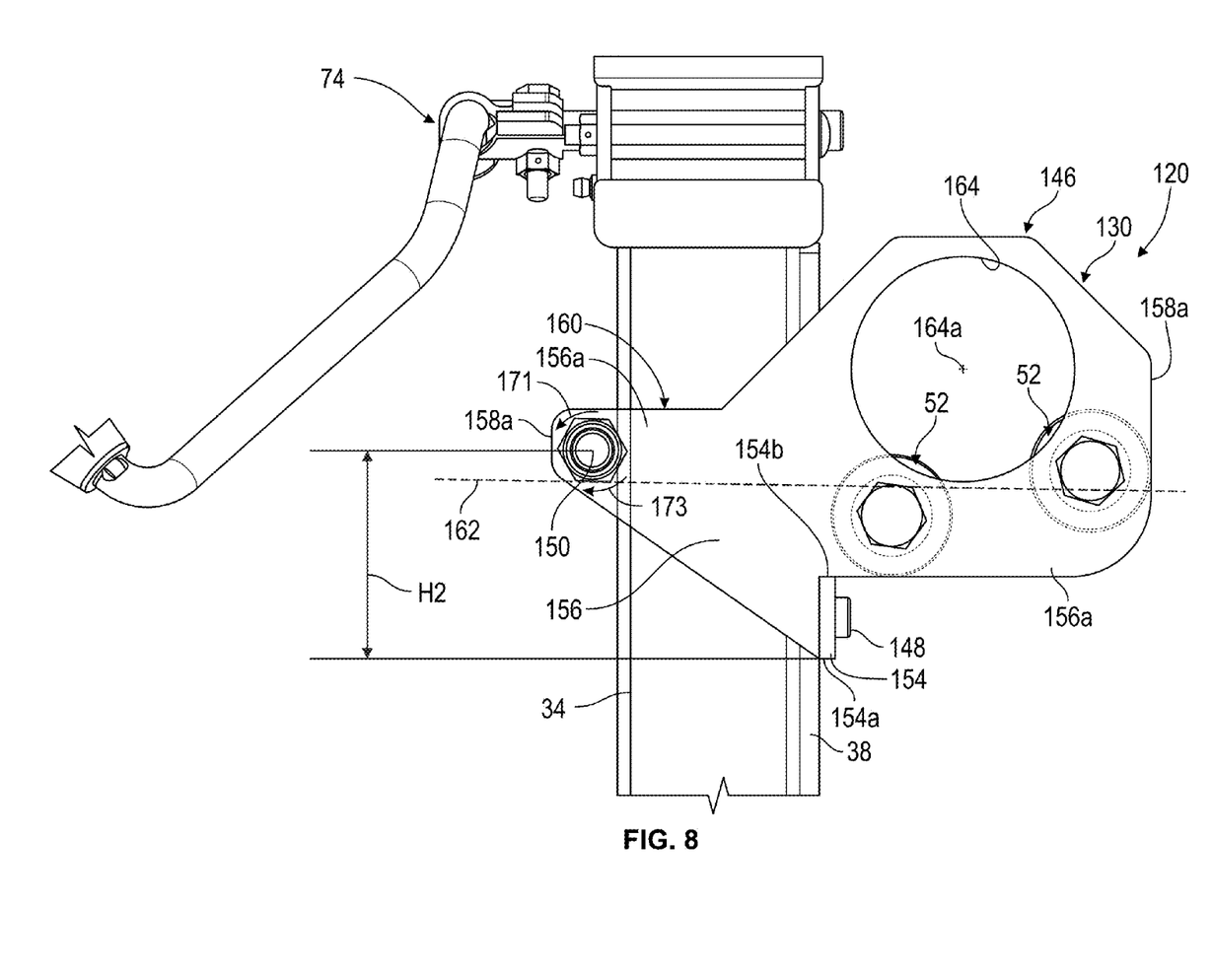
FIG. 8 is a side elevation view of a reel stand according to yet another embodiment of the disclosure shown engaged with storage reel or spool, spool.

As shown in FIG. 8, the positions of the pivot pin 150 and the locking pin 148 are reversed from that shown in FIGS. 2-7, such that the pivot pin 150 is positioned above the centerline 162 of the plate 146, and the locking pin 148 is positioned below the centerline 162 of the plate 146. In this embodiment, the head 130 includes a generally U-shaped plate 146 is formed from a base wall 154 and a pair of side walls 156 (only one side wall 156 is shown) extending therefrom. If desired, an end wall (not shown) can be provided between the ends of the side walls 156 opposite to that of the base wall 154 to form a tube-like structure. The base wall 154 has a lower edge 154a and an upper edge 154b and opposite side edges. The base wall 154 abuts against the side wall 38 of the post 34. The side walls 156 extend from the side edges of the base wall 154. A first section 156a of each side wall 156 extends proximate to, but spaced from the side wall 38 of the post 34 and a second section 156b of each side wall 156 extends outwardly from the side wall of the post 34 and terminates in an end 158. The first and second sections 156a, 156b of each side wall 56 are aligned. The base wall 154 and the first sections 156a define a cavity 160 into which the post 34 seats. The horizontal centerline 162 of the plate 146 is defined between the opposite ends 158a, 158*b* of the side walls 156. The first sections 156*a* of the side walls 156 may be shaped to conform to the cross-section of the post 34.

The second section 156*b* of each side wall 156 has a space 164 therein through which the spindle 24 extends in use. The space 164 in each side wall 156 may be surrounded by the second section 156*b* of each side wall 156, as shown in FIG. 8 to form a through hole, or may be partially surrounded by the second section 156*b* of each side wall 156 (for example, the top side of each space 164 may be open like that shown in FIG. 7). Each space 64 has a centerline 164*a* and the spaces 64 are aligned with each other.

The locking pin 148 extends from the inner surface of the base wall 154 toward the post 34. The locking pin 148 is suitably attached to the base wall 154, such as by being integrally formed, formed as a separate member and welded thereto, or being threadedly engaged with the base wall 154. The locking pin 148 has a diameter which is slightly smaller than the diameters of the holes 36, such that the locking pin 148 can be inserted into and removed from the holes 36 as described herein.

The pivot pin 150 extends between the second sections 156*b* of each side wall 156. The plate 146 can pivot around the pivot pin 150. The pivot pin 150 is positioned proximate to the side wall 38 of the post 34 and the pivot pin 50 is always engaged with the side wall 38 of the post when the locking pin 48 is engaged in a hole 36. The pivot pin 150 is positioned on the opposite side of the post 34 to that where the locking pin 148 is provided. As shown in FIG. 8, in some embodiments, the pivot pin 150 is positioned above the centerline 162 of the plate 146, and the locking pin 148 is positioned below the centerline 162 of the plate 146. The position of the axis of the pivot pin 150 relative to the lower edge 154*a* of the base wall 154 defines a height H2. The space 164 in each side wall 156 may be positioned anywhere in the second section 156*b*, provided the spaces 164 are outboard of the locking pin 148. For example, the spaces 164 may pass through the centerline 162.

The roller assemblies 52 are identically formed to that of the first embodiment and the specifics are not repeated herein.

In use, the position of the head 130 is adjusted to raise or lower the head 130 to the height of the spindle 24 within the storage reel or spool 22. In an initial position as shown in FIG. 8, the locking pin 148 is engaged within one of the holes 36 in the post 34. To adjust the position of the head 130 relative to the post 34, the plate 146 is pivoted around pivot pin 150 in a first direction 171 relative to the centerline 162 to remove the locking pin 148 from the hole 36. The height H2 between the centerline of the pivot pin 150 and the lower edge 154*a* of the base wall 154 provides the ability to disengage locking pin 148. During this disengagement of locking pin 148, the upper edge 154*b* of the base wall 154 may engage with the side wall 38 of the post 34. The head 130 is then slid along the height of the post 34 until the head 130 is positioned in the desired position. The plate 146 is then pivoted in a second, opposite direction 173 around pivot pin 150 relative to the centerline 162 to reengage the locking pin 148 within the new hole 36 that is proximate to the locking pin 148 in the new position. The weight of the spindle 24 and the storage reel or spool 22 puts a moment on the plate 146 about the pivot pin 150, keeping the locking pin 148 retained in the hole 36 in the post 34.

While both side walls 56, 156 are shown as having spaces 64, 164, the outer side wall 56 (the one farthest away from the spindle 24 when it is inserted) can be solid, while the inner side wall 56 (the one closest to the spindle 24 when inserted) includes the space 64.

Figure 9:
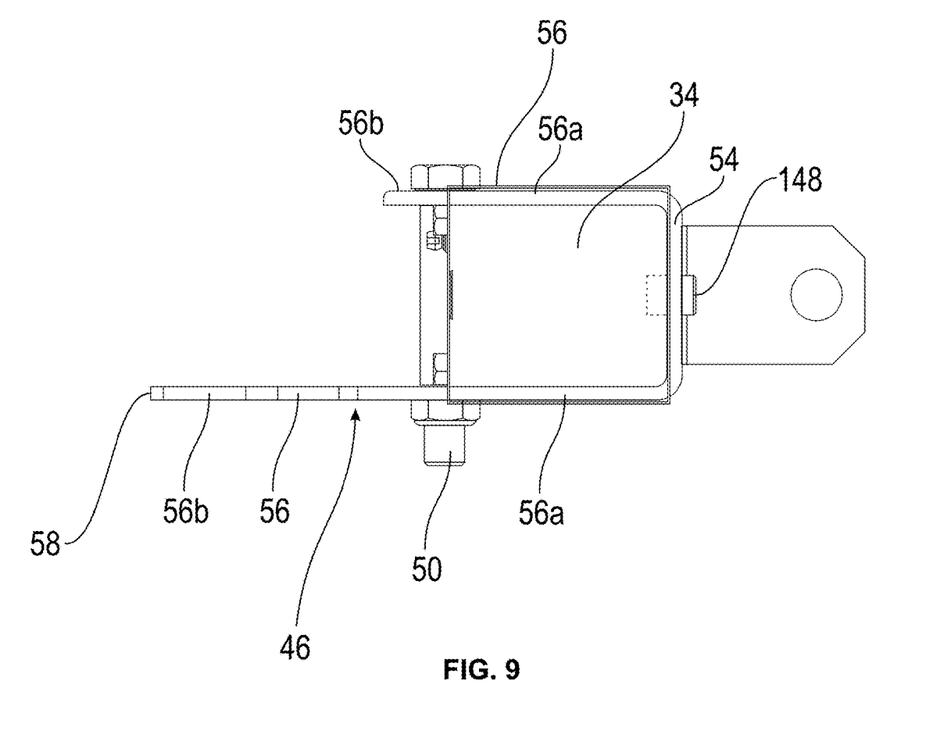
FIG. 9 is a top plan view of modified plate of the reel stand.

FIG. 9 shows a modified embodiment of the plate 46. In this embodiment, one side wall 56 has been modified such that the second section 56*b* does not extend the same length as the other second section 56*b* such that the modified side wall 56 does not include the space 64. The roller assemblies 52 are eliminated. In this embodiment, the spindle 24 extends through one side wall 56. While this is shown for the embodiment of FIGS. 2-6, it is to be understood that this modification can be provided with the embodiments of FIGS. 7 and 8. The reel stand 20 of some embodiments also includes a carrying handle 72. The reel stand 20 may additionally include a reel stand crank assembly 74. The reel stand crank assembly 74 is used raise or lower the reel stand 20 to lift or lower the storage reel or spool 22 relative to the floor or ground.

As a result of the structure, the position of the head 30, 130 relative to the post 34 can be quickly and easily adjusted, before actual lifting of the storage reel or spool 22 occurs using the reel stand crank assembly 74. Since a single locking pin 48, 148 is provided, the reel stand 20, 120 has less parts than other adjustment mechanisms, and can be produced at a low cost. Also, the quick change height adjustment mechanism provides a smaller profile that allows for other components of the reel stand 20, 120 to occupy space normally needed by prior art adjustment mechanisms.

While particular embodiments illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:
1. A reel stand comprising:
   a plate having a base wall and a pair of side walls extending from the base wall, the base wall and side walls defining a cavity, at least one of the side walls having a space at least partially surrounded by the sidewall, the space capable of receiving a spindle of an associated reel therethrough, and a horizontal centerline defined between opposite ends of the plate;
   an upright post having a side wall, the side wall of the post having at least two spaced apart locking pin supports disposed thereon, the post being seated within the cavity;
   a locking pin extending from the plate and into the cavity, the locking pin being proximate to the post and capable of engagement with the locking pin supports, the locking pin being vertically spaced from the centerline and positioned on a first side of the centerline; and
   a pivot pin attached to the plate, wherein the plate is capable of pivoting relative to the post around the pivot pin, the pivot pin being vertically spaced from the centerline and from the base plate and positioned on a second, opposite side of the centerline, the pivot pin being positioned on an opposite side of the post from the locking pin.

2. The reel stand of claim 1, wherein the pivot pin is below the centerline and the locking pin is above the centerline.

3. The reel stand of claim 2, wherein the space and the pivot pin are located on the same side of the post.

4. The reel stand of claim 1, wherein the pivot pin is above the centerline and the locking pin is below the centerline.

5. The reel stand of claim 4, wherein the space and the locking pin are located on the same side of the post.

6. The reel stand of claim 1, wherein the space and the pivot pin are located on the same side of the post.

7. The reel stand of claim 1, wherein the space and the locking pin are located on the same side of the post.

8. A reel stand comprising:
a plate having a base wall and a pair of side walls extending from the base wall, the base wall and side walls defining a cavity, at least one of the side walls having a space at least partially surrounded by the sidewall, the space capable of receiving a spindle of an associated reel therethrough, and a horizontal centerline defined between opposite ends of the plate;
an upright post having a side wall, the side wall of the post having at least two spaced apart holes therein, the post being seated within the cavity;
a locking pin extending from the base wall and into the cavity, the locking pin being proximate to the post and capable of engagement with the holes in the side wall of the post, the locking pin being vertically spaced from the centerline and positioned on a first side of the centerline; and
a pivot pin attached to the side walls of the plate, wherein the plate is capable of pivoting relative to the post around the pivot pin, the pivot pin being vertically spaced from the centerline and from the base plate and positioned on a second, opposite side of the centerline, the pivot pin being positioned on an opposite side of the post from the locking pin.

9. The reel stand of claim 8, wherein the pivot pin is below the centerline and the locking pin is above the centerline.

10. The reel stand of claim 9, wherein the space and the pivot pin are located on the same side of the post.

11. The reel stand of claim 8, wherein the pivot pin is above the centerline and the locking pin is below the centerline.

12. The reel stand of claim 11, wherein the space and the locking pin are located on the same side of the post.

13. The reel stand of claim 8, wherein the space and the pivot pin are located on the same side of the post.

14. The reel stand of claim 8, wherein the space and the locking pin are located on the same side of the post.

15. The reel stand of claim 8, wherein the holes are formed as through holes.

16. The reel stand of claim 8, wherein the holes are formed as recesses.

17. The reel stand of claim 8, wherein the space is at least partially surrounded by the respective side wall of the plate.

18. The reel stand of claim 8, further comprising at least one roller mounted between the pair of side walls of the plate and rotatable relative to the pair of side walls of the plate, the at least one roller overlapping the space.

19. The reel stand of claim 8, wherein the post comprises two telescoping tubes.

20. The reel stand of claim 8, wherein the locking pin is integrally formed with the base wall.

21. The reel stand of claim 8, wherein the locking pin is fastened to the base wall.

22. The reel stand of claim 8 in combination with a second reel stand.

23. The reel stand of claim 8 in combination with a second reel stand and a storage spool.

* * * * *